Patented Aug. 6, 1935

2,010,606

UNITED STATES PATENT OFFICE 2,010,606

PROCESS OF COLORING AND IMPROVING LUBRICATING OIL

Franz Rudolf Moser, Amsterdam, Netherlands, assignor to Shell Development Company, San Francisco, Calif., a corporation of Delaware No Drawing. Application August 19, 1930, Serial No. 476,436. In the Netherlands August 30, 1929

5 Claims. (Cl. 196—151)

The invention relates to a process of preparing substances having an oily or asphaltic consistency.

It has been found that the above products can be advantageously prepared from the extract obtained in the treatment of hydrocarbons, such as petroleum products and the cracking products obtained therefrom, shale oils, oils obtained by the destructive hydrogenation of coal or carbonaceous materials with liquid sulfur, dioxid or analogous solvents. In principle the process according to the invention consists in the said extracts being subjected to a polymerization.

As is known liquid lubricating oil distillates can be polymerized by the aid of such catalysts as water-free metal chlorides, e. g. $AlCl_3$, whereby products suitable for use as lubricating oil can be obtained.

As is also known, lubricating oil can be prepared from tar oils obtained by the distillation of coal, by heating either under atmospheric or superatmospheric pressure, which method is likewise based on polymerization. From these known facts however, the process according to the invention could not by any means be deduced, seeing that both the starting material and the final products differ from the above-named substances. Moreover it was not known that the extracts in question could be polymerized, whilst the invention is based on finding out that the said extracts in question contain just those constituents, which make the oil particularly suitable for polymerization.

The products obtained according to the present invention are suitable for various purposes. The polymerized product in many instances shows a light color and an intense green fluorescence so that it is suitable e. g. as a coloring agent for lubricating oil, the addition of a small quantity being sufficient to impart to the lubricating oil the desired green fluorescent color. Furthermore in many instances the polymerized product can, after a proper concentration, be used as asphalt. According to the polymerization method followed the asphalt assumes a more or less light color.

If the process according to the invention is applied to the $SO_2$ extract of a suitable composition, then the polymerized products can be also worked up to give lubricating oil. This, for instance, is the case when extracts rich in unsaturated aliphatic hydrocarbons are polymerized such as e. g. extracts obtained from cracking distillates of mineral oil.

According to one of the modes of application of the process according to the invention the extract is heated for some time at an elevated temperature. The temperature can (in such a process) range between wide limits and in general suitable temperatures will be between 200 and 500° C. The heating of the extract has to be effected by preference in closed receptacles or the like, as a consequence of which pressure is produced, so that the material is heated under pressure. By this heating, a product is obtained which may show a green fluorescent color and which then for instance, is eminently suitable to be used for coloring lubricating oils of various grades.

Another form of application of the process according to the invention consists in treating the extract with the substances promoting the polymerization as previouly mentioned. As such, for instance, water free metal halides, such as $ZnCl_2$, $AlCl_3$, $FeCl_3$, $SnCl_4$, chlorides of sulphur e. g. $S_2Cl_2$, acids such as sulphuric acid, aromatic sulfonic acids and phosphoric acid in various concentrations, glacial acetic acid, $KHSO_4$, gaseous substances such as $BF_3$ and halogen hydracids (e. g. HCl) may be employed. Furthermore substances with a large active surface, such as active carbon, silica gel, kieselguhr etc., can also be used as polymerizers. This latter treatment can be effected even at ordinary room temperature, preferably however, at raised temperatures up to 350° C. and higher.

When using catalysts, such as $AlCl_3$ and $FeCl_3$, which as is known promote the cracking, at higher temperatures, it is obvious that the temperature has to be so chosen that the polymerization, and not the cracking, is predominant. A proper division and distribution of the catalyst, e. g. by stirring, promotes the reaction. In this case also a product is obtained which can be used, for instance, as a coloring agent for lubricating oils.

The coloring agents for lubricating oil which are prepared as above, can further be improved in color either by refining the $SO_2$ extract before the polymerization or by refining the polymerized product in the usual manner.

The products obtained either by a mere heating treatment or by a treatment in the presence of polymerizers can be subjected, either after refining or without refining, to a distillation, if desired with the aid of steam and/or vacuum. As a still residue there is obtained a substance having an oily or asphaltic consistency, according as the distillation is more or less intensive, whilst the distillate can be used for example as a fuel oil.

A variation of the first mentioned mode of procedure of the present process consists in subjecting the $SO_2$ extract, with or without a previous refining, directly to distillation, whereby a more or less intensive polymerization arises in consequence of the heating during the distillation. As a residue in this case also a substance is obtained with oily or asphaltic consistency depending on the more or less intensive distillation. However, with this mode of treatment the yield of the latter substance in general will be lower than when working according to the two other treating methods given. In general the greater the viscosity of the extract under treatment, the larger will be the yield. An oil is obtained as a distillate, the properties of which are, inter alia, dependent upon the starting material.

A special advantage of the process according to the invention is that the substances with asphaltic consistency in many instances have a light color and consequently are suitable for various purposes, for which ordinary dark asphalt can not be used. Such a light colored asphalt is obtained, for instance, when the polymerization is carried out with $ZnCl_2$ or $AlCl_3$ which substances also have a refining effect. Also in those cases where a re-refinement is carried out, a light colored asphalt is obtained.

The use of $ZnCl_2$ or $AlCl_3$ as polymerizers has the further advantage that they already bring about a refining action, as a result of which the products obtained (either with or without re-refining or distillation) have an excellent color.

For the re-refining of the polymerized products it is also possible to make use of $ZnCl_2$ or $AlCl_3$. The separation of the polymerizers is very easily effected particularly when using $ZnCl_2$ in view of the fact that a rapid precipitation of the polymerizer in the form of a dark sludge containing most probably $ZnCl_2$—addition products occurs as soon as stirring is stopped. Further for the removal of polymerizers use can be made of known auxiliaries, such as filtering or centrifuging. The recovered catalyst can be used again in the process.

Further it was found that the distillates obtained in the process according to the invention could be again subjected to a polymerization.

A few examples may serve to illustrate the invention, these examples being given purely by way of example.

*Example I*

An Edeleanu extract, from a lubricating oil distillate (with a viscosity of 1200 Saybolt furol at 25° C.) yielded, by distillation with steam, 28% of a light colored green fluorescent mass suitable for use as asphalt, with a melting point according to the ring and ball method of 33.5° C.

*Example II*

An Edeleanu extract with a Saybolt furol viscosity of 36 sec. at 25° C. after a pre-refining with sulphuric acid, followed by a treatment with fuller's earth and lime, was steam-distilled, up to 350° C. This yielded 4% of a light colored green fluorescent asphaltic residue. If the distillation is not carried to such a high temperature, but only to, say 300° C., then a green fluorescent product is obtained, which can be used for coloring lubricating oil.

In general, when applying the mode of application of the process illustrated by the above example care has to be taken that the distillation is not carried too far, as otherwise the danger arises that the residue will become too dark in color. Thus I recommend temperatures not over 400° C. This may be largely prevented by a pre-refining as indicated in this example.

*Example III*

An Edeleanu extract as mentioned in Example II is heated for 4 hours at 300° C. with 10% $ZnCl_2$ whilst stirring.

After cooling the catalyst mass is filtered out. The result is a green fluorescent oil, which can be used as a coloring medium for a lubricating oil.

About the same effect can be obtained by heating the extract to 390° C., for 7 hours, or to 400° C. for 4 hours, without the catalyst.

In case it is desired to use the product obtained as a coloring medium, then it (with or without a previous refining) can be added to the lubricating oil to be colored. The lubricating oil to be colored may be first passed through one or more of the stages of lubricating oil refining, before adding the above. If e. g. the coloring medium is added to the lubricating oil after the latter has been treated with acid, but before the neutralization, the crude polymerization product may be used. Refining of the coloring medium is however recommended if it has to be added to the finished lubricating oil. The addition of the polymerized product lowers the pour point of the lubricating oil.

*Example IV*

To extract, produced in refining spindle oil by the Edeleanu process, 10% by weight of $ZnCl_2$ is added, after which the whole mass is kept 4 hours at 300° C. whilst stirring.

After precipitation of the zinc chloride, which takes place in the form of a dark sludge, containing probably besides unchanged $ZnCl_2$ organic addition products of $ZnCl_2$, the reaction product is filtered from the catalyst.

The filtrate, after distilling off up to 350° C., yields (as the still residue) 13% light colored asphalt with a melting point (ring and ball method) of 34° C. and a penetration of 249 at 25° C.

*Example V.*

$BF_3$ is passed through Edeleanu-extract from treatment of spindle oil, for one hour at room temperature. After distilling off, a light colored asphalt is obtained with a melting point (ring and ball method) of 39° C. and a penetration of 138 at 25° C.

*Example VI*

Edeleanu extract from spindle oil is heated e. g., for 5 hours at 400° C., in a closed space and subsequently refined with 4% $H_2SO_4$, 5% fuller's earth and 5% lime. After distilling off, 13% of a light colored asphalt is obtained with a melting point (ring and ball method) of 39° C. and a penetration of 138, at 25° C.

*Example VII*

Edeleanu extract as used in Example II is heated for 24 hours with 10% $FeCl_3$ to 100° C. After filtering out the catalytic mass, the polymerized extract is treated with 10% $ZnCl_2$ for 30 minutes at 300° C., whilst stirring. The brownish black color thereby turns to yellowish green. On distilling off, 3% of a very light colored asphalt is obtained with a melting point (ring and ball method) of 38° C. and a penetration of 151 at 25° C.

*Example VIII*

An Edeleanu extract as used in Example II is treated with 20% S₂Cl₂ for 24 hours at room temperature. After distilling off, 50% dark colored asphalt is obtained with a melting point (ring and ball method) of 68° C. and a penetration of 6 at 26° C. The yield is dependent on the quantity of catalyst used and the time, a greater amount of catalyst and a longer time, both tending to increase the yield within certain limits.

Heat treatment and use of polymerizers can also be used successively, e. g. by adding the catalyst cold, to the extract, letting stand cold, for several hours, preferably whilst stirring (at least occasionally), then filtering out the catalyst and heating to the temperatures as given in the examples, or to somewhat higher temperatures. The simultaneous heating, and agitating with catalyzers is usually preferable.

I have discussed above, extract obtained by treating oily products of a hydrocarbon nature, and especially mineral oil products by the Edeleanu process (liquid SO₂ treatment). The extracts obtained by analogous treatment of the oils with other solvents or refining agents can be treated in a similar manner. All these are termed "solvents" hereinafter. Examples of solvents are furfurol, aniline, acetic anhydrid, various alcohols and esters.

I claim:—

1. Process of coloring and improving lubricating oils, which comprises the addition to the lubricating oil of a small quantity of a liquid product obtained by polymerization of the extract obtained from the treatment of hydrocarbons by liquid SO₂.

2. The process of coloring and improving lubricating oils, which comprises extracting a mineral oil with sulphur dioxide, polymerizing the extraction product and adding a small amount of the said polymerization product to a lubricating oil.

3. The process as set forth in claim 2, in which the polymerization product is refined before adding to the lubricating oil.

4. As a new article of manufacture, a blended oil comprising a lubricating oil and added thereto a quantity of polymerized liquid sulfur dioxide extract of a mineral oil, said quantity being sufficient to impart to the lubricating oil a green fluorescence.

5. As a new article of manufacture, a blended oil comprising a lubricating oil and added thereto a quantity of the product produced by polymerizing the liquid sulfur dioxide extract of a mineral oil by heating the same in the absence of a catalyst, the quantity of the added product being sufficient to impart to the lubricating oil a green fluorescence.

FRANZ RUDOLF MOSER.